Patented Apr. 27, 1954

2,676,922

UNITED STATES PATENT OFFICE 2,676,922

CONDITIONING HARD WATER CONTAINING ALKALINITY

Samuel W. Waisbrot, Canton, Ohio, assignor to The Permutit Company, New York, N. Y., a corporation of Delaware No Drawing. Application September 14, 1948, Serial No. 49,305

4 Claims. (Cl. 210—24)

This invention relates to the ion exchange treatment of water containing both permanent and temporary hardness to condition the water so that it is fully softened and has its temporary hardness, or alkalinity, reduced to a low level.

In the conditioning of water, the raw water to be treated frequently contains both temporary and permanent hardness. In such a water the difference between the total hardness and the alkalinity is the permanent hardness while the temporary hardness is equal to the alkalinity. The alkalinity, more properly described as the methyl orange alkalinity, is the sum of the carbonates, bicarbonates and hydroxides in the water, but, since most natural or raw waters contain little or no carbonates and hydroxides, the alkalinity is usually considered for all practical purposes as equivalent to the bicarbonates in the water.

Various procedures have been suggested for treating such water by ion exchange to remove most or all of the permanent hardness and reduce the alkalinity of the water to a low level. When the ordinary organic cation exchange materials are used for this purpose and are regenerated with an acid to operate as hydrogen exchange materials, the salts of strong acids in the water are converted to their corresponding acids, some of which neutralize the alkalinity or bicarbonates. However, in such a process free mineral acids, or an excess of the acids over the amount needed for this neutralization or usually left in the water if the process is operated to produce anywhere near complete softening. When such an ion exchange material is regenerated with salt, complete softening can, of course, be obtained but the alkalinity of the water is not reduced. Consequently, it has been proposed heretofore to regenerate such exchange materials with a mixture of salt and acid. However, such salt-acid regeneration is not reliable for producing an effluent that is fully softened and at the same time has its alkalinity reduced to a constant low value. In fact, the reduction in alkalinity is variable in such a process and the effluent frequently contains free mineral acidity which renders it obviously objectionable for many uses.

In order to obtain consistent results, such water has been conditioned heretofore by the blending method which involves passing separate streams of the hard water through separate ion exchange units, one regenerated with acid and the other with salt, and then blending the effluents from these separate units in the proper proportions to produce a softened water having the desired reduced amount of alkalinity. Such a procedure not only is complicated to operate and requires the use of extra equipment and expensive controls, but also requires the use of fairly large amounts of regenerants per volume of water treated.

An object of this invention is to provide a simple process of conditioning such a hard water by ion exchange to produce complete or nearly complete softening, as desired, and obtain simultaneously a reduction in alkalinity to a consistent low value without any free mineral acidity in the treated water.

Another object of the invention is to condition hard water containing alkalinity to achieve such results by flowing the hard water through a single bed containing different kinds of ion exchange materials regenerated with both salt and acid.

A further object of this invention is the provision of a mixed bed of different ion exchange materials which can be operated by a single passage of hard water therethrough to produce results not obtainable with a bed of either ion exchange material alone.

I have found that by combining in one ion exchange unit a cation exchange material of the sulfonated type with a cation exchange material of the carboxylated type and regenerating such a mixed bed with both salt and acid, hard water containing alkalinity can be conditioned in a single operation to reduce the alkalinity consistently to a low value and at the same time soften the water to, or substantially to, zero hardness. The proportions of sulfonated and carboxylated cation exchange materials employed in the bed are largely dependent on the composition of the raw water to be treated. For example, to obtain the best results the amount of the sulfonated cation exchange material should be approximately proportional to the amount of permanent hardness of the water being treated and inversely proportional to the exchange capacity of the exchange material. The amount of the carboxylated cation exchange material, on the other hand, should be approximately proportional to the temporary hardness of the water being treated and inversely proportional to the exchange capacity of this exchange material.

The regeneration of this mixed bed when it becomes exhausted is preferably carried out with both salt and acid. These regenerants may be applied separately to the bed in any order, or they may be mixed together before being introduced into the bed. In general, it is desirable in this process to employ a quantity of acid calculated to regenerate the carboxylated cation exchange material and a quantity of salt calculated to regenerate the sulfonated cation exchange material, taking into account the amounts and exchange capacities of the two materials in the bed.

By sulfonated cation exchange materials is meant any suitable organic cation exchanger containing principally or entirely sulfonic groups as its active exchange radical. Examples of such materials include resins described in United States Patents Nos. 2,228,159, 2,319,359 and 2,366,007, as well as cation exchangers made by the sulfonation of organic materials such as bituminous coal as described in Patents Nos. 2,191,060 and 2,206,007. By carboxylated cation exchange materials is meant organic cation exchange materials which contain as their sole or principal active exchange radical one or more of the various carboxylic groups. One suitable material in this category is a resin of the type described in co-pending Holmes, et al. application Serial No. 713,386, filed November 30, 1946, now Patent No. 2,575,518, in this case a resin prepared so that it contains substituted acetic groups as its principal active exchange radical. By substituted acetic group is meant the group —$CH_2COOX$ in which X is hydrogen, sodium or any other exchangeable cation. Other examples of suitable carboxylated resins for purposes of my invention are described in United States Patent Nos. 2,340,111 and 2,409,861. It may also be possible to substitute for the carboxylated exchange material a resin or organic cation exchanger containing some other active radical capable of splitting the salts of weak acids but incapable of splitting the salts of strong acids.

In the operation of my process the different cation exchange materials in the desired proportions are placed together in a single bed. They may be placed in the bed in the form of separate layers or the different exchange materials may be completely intermingled and mixed in the bed. This bed is then regenerated by introducing appropriate amounts of dilute acid and salt solutions. The particular strength of the solutions is not critical although I have found that good results are obtained with a mixture of a 1% solution of sulfuric acid and a 10% solution of sodium chloride.

While I do not wish to be bound by any theory, I believe that when water containing both permanent and temporary hardness is passed through such a bed, the carboxylated exchange material contains principally exchangeable hydrogen ions by reason of regeneration with the acid, and removes principally temporary hardness from the water, while the sulfonated exchange material has been regenerated principally by the salt, and operates essentially to remove the permanent hardness from the water.

In any event, when such a mixed bed is regenerated by means of salt and acid in amounts calculated for the sulfonated and carboxylated exchange materials respectively, a water containing both permanent and temporary hardness can be conditioned by a single passage through the bed to produce complete softening and reduce the alkalinity to a low figure without production of any free acidity. In other words, if the alkalinity of the effluent is plotted against time or volume of flow of the water through the bed during a given cycle of operation, the alkalinity curve obtained is relatively low and flat, showing a consistent reduction to a low level throughout the entire cycle of operation.

In order to illustrate my invention, the following examples are given although it is to be understood the process is not limited to the particular conditions thereof.

*Example 1.*—A 1″ diameter tube was filled with a mixture of 140 ml. of carboxylated vinyl polymerisate cation exchange resin prepared according to United States Patent No. 2,340,111, and 60 ml. of a sulfonated vinyl polymerisate prepared according to United States Patent No. 2,366,007. This bed of exchange materials was then regenerated with a mixture of acid and salt made up of 450 ml. of 1% sulfuric acid and 96 ml. of a 15% aqueous solution of sodium chloride. The bed was rinsed with soft water and used for conditioning hard water of the following analysis expressed in terms of $CaCO_3$:

| | P. p. m. |
|---|---|
| Total hardness | 390 |
| Calcium | 260 |
| Magnesium | 130 |
| Sodium | 37 |
| Bicarbonate alkalinity | 135 |
| Chloride | 157 |
| Sulfate | 135 |

As this hard water was passed through the tube, aliquot portions of the effluent were collected and tasted for alkalinity and total hardness with the following results:

| Liters Treated | Bicarbonate Alkalinity, p. p. m. | Total Hardness, p. p. m. |
|---|---|---|
| 1 | 38 | 5 |
| 2 | 33 | 0 |
| 3 | 29 | 0 |
| 4 | 22 | 0 |
| 5 | 18 | 0 |
| 6 | 15 | 0 |
| 7 | 13 | 0 |
| 8 | 11 | 0 |
| 11 | 7 | 8 |

*Example 2.*—A 1″ diameter tube was filled with a mixture of 114 ml. of a phenoxy-acetic acid resin prepared in accordance with said Holmes, et al. application Serial No. 713,386, and 86 ml. of a sulfonated vinyl polymerisate cation exchange resin prepared according to United States Patent No. 2,366,007. This bed was regenerated with a mixture of salt and acid prepared by mixing 240 ml. of 1% sulfuric acid with 200 ml. of a 10% aqueous sodium chloride solution. Hard water having the same analysis given in Example 1 was passed through the bed and each successive liter of effluent was analyzed giving the following results during a typical run:

| Liters Treated | Bicarbonate Alkalinity, p. p. m. | Total Hardness, p. p. m. |
|---|---|---|
| 1 | 14 | 0 |
| 2 | 12 | 0 |
| 3 | 12 | 0 |
| 4 | 14 | 0 |
| 5 | 12 | 0 |
| 6 | 10 | 0 |
| 7 | 12 | 0 |
| 8 | 12 | 0 |
| 9 | 10 | 0 |
| 10 | 10 | 0 |
| 11 | 8 | 0 |
| 12 | 8 | 0 |
| 13 | 8 | 0 |
| 14 | 8 | 0 |
| 15 | 4 | 0 |
| 16 | 4 | 0 |
| 17 | 4 | 0 |
| 18 | 16 | 12 |

*Example 3.*—A 1″ diameter tube was filled with a mixture of 183 ml. of a phenoxy-acetic acid resin prepared in accordance with said Holmes, et al. application Serial No. 713,386, and 17 ml. of a sulfonated vinyl polymerisate cation exchange resin prepared in accordance with United States Patent No. 2,366,007. The bed of mixed resin was regenerated with 400 ml. of 1% sulfuric acid and then by treatment with 100 ml. of a 5% aqueous sodium chloride solution. The regenerants were washed out of the bed with 200 ml. of water. This bed was then used to treat a well water having the following analysis expressed in terms of $CaCO_3$:

| | P. p. m. |
|---|---|
| Total hardness | 133 |
| Calcium | 119 |
| Magnesium | 14 |
| Sodium | 6 |
| Bicarbonate alkalinity | 115 |
| Chloride | 10 |
| Sulfate | 14 |

Each successive gallon of the effluent from the tube was collected and analyzed, the tube being operated at a flow rate of 3 G. P. M. per square foot. The results during a typical run were as follows:

| Gallons Treated | Bicarbonate Alkalinity, p. p. m. | Total Hardness, p. p. m. |
|---|---|---|
| 1 | 22 | 0 |
| 2 | 22 | 0 |
| 3 | 22 | 0 |
| 4 | 15 | 0 |
| 5 | 13 | 0 |
| 6 | 11 | 0 |
| 7 | 9 | 0 |
| 8 | 9 | 0 |
| 9 | 22 | 0 |
| 9½ | 30 | 0 |
| 10 | 35 | + |

*Example 4.*—A rubber lined cation exchange unit 24″ in diameter by 7′ in height was filled with a mixture of 6.5 cubic feet of a carboxylated phenolic resin prepared according to said Holmes, et al. Patent No. 2,575,518, and 2.5 cubic feet of a sulfonated phenol formaldehyde cation exchange resin. This exchange unit was regenerated with 25 lbs. of sodium chloride and 8.5 lbs. of sulfuric acid, the mixture of salt and acid being passed through the bed of mixed resins at concentrations of 6.5% NaCl and 2.4% $H_2SO_4$. In this condition the bed was used to soften a water taken from Lake Erie which had the following analysis expressed in terms of $CaCO_3$:

| | P. p. m. |
|---|---|
| Total hardness | 134 |
| Calcium | 102 |
| Magnesium | 32 |
| Sodium | 19 |
| Bicarbonate alkalinity | 95 |
| Chloride | 30 |
| Sulfate | 28 |

During a typical run successive portions of the effluent were sampled and analyzed for hardness and bicarbonate alkalinity with the following results:

| Gallons Treated | Bicarbonate Alkalinity, p. p. m. | Total Hardness, p. p. m. |
|---|---|---|
| 0 | 15 | 0 |
| 500 | 14 | 0 |
| 1,000 | 11 | 0 |
| 2,000 | 12 | 0 |
| 3,000 | 12 | 0 |
| 4,000 | 11 | 0 |
| 5,000 | 11 | 0 |
| 6,000 | 11 | 0 |
| 7,000 | 11 | 0 |
| 8,000 | 10 | 0 |
| 9,000 | 9 | 0 |
| 10,000 | 7 | 0 |
| 11,000 | 6 | 0 |
| 12,000 | 5 | 11 |

The effective alkalinity removal capacity of the carboxylated resin was 9.2 kilograins (expressed as $CaCO_3$) per cubic foot, while the effective hardness removing capacity of the sulfonated resin was 13.8 kilograins (expressed as $CaCO_3$) per cubic foot. These values compared very closely with laboratory determinations of the exchange capacities of the resins made by testing them in the plain hydrogen and sodium cycles respectively.

It will be apparent from the foregoing examples that by using salt-acid regeneration and a bed containing both sulfonated and carboxylated resins, water containing both permanent and temporary hardness can be fully softened by a single treatment which reduces the bicarbonate alkalinity of the softened water to a desirable low value without producing any free mineral acidity in the treated water. Such a procedure makes possible the control of hardness and alkalinity in a simple manner that is not possible by using either of these ion exchange materials alone.

In addition, such a procedure is very economical to operate so far as the cost of regenerants is concerned. As contrasted with the more involved and cumbersome blending method of treating this type of water, my procedure requires substantially less acid for regeneration and the total cost of regenerants per 1000 gallons of water treated is less.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A process of conditioning hard water containing alkalinity which comprises flowing such water through a bed containing different kinds of cation exchange resins, one of said resins having sulfonic groups as its active exchange radical and another of said resins having carboxylic groups as its active exchange radical, regenerating said bed with both salt and acid in amounts calculated to regenerate said sulfonic group and carboxylic group resins respectively, and then continuing the flow of said water.

2. A process of conditioning water containing substantial amounts of both permanent and temporary hardness to soften the water and reduce its alkalinity to a low level which comprises flowing the hard water through a bed of granular organic cation exchange resins regenerated with both salt and acid, said bed containing a mixture of exchange resins having sulfonic groups and exchange resins having substituted acetic groups in amounts proportioned approximately in accordance with the amounts of permanent and and temporary hardness respectively in said water.

3. A process of conditioning water containing substantial amounts of both permanent and temporary hardness to soften the water and reduce its alkalinity to a low level which comprises successively flowing the hard water through a bed containing both organic cation exchange resin having sulfonic groups as its active exchange radical and organic cation exchange resin having substituted acetic groups as its active exchange radical, and regenerating said bed with amounts of salt and acid calculated to regenerate said first mentioned exchange resin and said second mentioned exchange resin respectively.

4. A process of conditioning water containing substantial amounts of both permanent and temporary hardness to soften the water and reduce its alkalinity to a low level which comprises flowing such water through a bed of granular organic cation exchange resins regenerated with both salt and acid, said bed containing exchange resins having active sulfonic groups and other exchange resins having active carboxylic groups in amounts proportioned approximately in accordance with the amounts of permanent and temporary hardness respectively in the water to be treated, and said bed being regenerated with amounts of salt and acid proportioned to regenerate said sulfonic exchange resins and said carboxylic exchange materials respectively.

References Cited in the file of this patent

UNITED STATES PATENTS

| Number | Name | Date |
|---|---|---|
| 2,104,501 | Adams et al. | Jan. 4, 1938 |
| 2,191,853 | Holmes | Feb. 27, 1940 |
| 2,204,539 | Wassenegger et al. | June 11, 1940 |
| 2,206,007 | Liebknecht | June 25, 1940 |
| 2,319,359 | Wassenegger | May 18, 1943 |
| 2,340,111 | D'Alelio | Jan. 25, 1944 |
| 2,376,914 | Gustafson | May 29, 1945 |
| 2,409,861 | Hunter | Oct. 22, 1946 |
| 2,575,518 | Holmes | Nov. 20, 1951 |

FOREIGN PATENTS

| Number | Country | Date |
|---|---|---|
| 389,076 | Great Britain | June 4, 1931 |
| 467,240 | Great Britain | June 14, 1937 |

OTHER REFERENCES

Nachod, Ion Exchange, pages 61, 62, 124, and 125, 1949.

Journal Physical Chemistry, vol. 47, pages 371–382, 1943.